US008902919B1

(12) United States Patent
Shupe

(10) Patent No.: US 8,902,919 B1
(45) Date of Patent: Dec. 2, 2014

(54) SCHEDULING FOR MIXED RFOG AND HFC NETWORKS BASED ON TRANSMISSION HISTORY

(75) Inventor: Victor Scott Shupe, Murfreesboro, TN (US)

(73) Assignee: ARRIS Enterprises, Inc., Suwanee, GA (US)

(\*) Notice: Subject to any disclaimer, the term of this patent is extended or adjusted under 35 U.S.C. 154(b) by 688 days.

(21) Appl. No.: 13/164,817

(22) Filed: Jun. 21, 2011

Related U.S. Application Data

(60) Provisional application No. 61/357,238, filed on Jun. 22, 2010.

(51) Int. Cl.
*H04B 7/212* (2006.01)

(52) U.S. Cl.
USPC ............................................. 370/442

(58) Field of Classification Search
CPC ............ H04L 5/22; H04L 5/26; H04L 47/70; H04N 7/22; H04N 21/6118; H04N 21/6168; H04B 10/2575
See application file for complete search history.

(56) References Cited

U.S. PATENT DOCUMENTS

| 7,187,669 | B1 * | 3/2007 | Lee .............................. 370/347 |
| 2010/0083330 | A1 * | 4/2010 | Bernstein et al. ............. 725/111 |
| 2010/0220994 | A1 * | 9/2010 | Pradzynski et al. ............. 398/1 |
| 2011/0142447 | A1 * | 6/2011 | Boyd et al. ....................... 398/58 |

OTHER PUBLICATIONS

U.S. Appl. No. 12/708,072 entitled "CMTS Scheduling for Mixed RFoG and HFC Networks" by Carol J. Ansley and Michael Emmendorfer filed Feb. 18, 2010.
U.S. Appl. No. 13/151,257 entitled Mitigating Noise and OBI in RFoG Networks by Venk Mutalik and Marcel Schemmann filed Jun. 1, 2011.

\* cited by examiner

*Primary Examiner* — Chirag Shah
*Assistant Examiner* — Jenkey Van
(74) *Attorney, Agent, or Firm* — Troy A. Van Aacken

(57) ABSTRACT

Methods, systems, and apparatuses used to avoid the scheduling of devices for transmission in overlapping time slots in a mixed HFC and RFoG network. A method of scheduling the transmission of user devices on a mixed RFoG and HFC network can include determining whether a lost transmission event occurred between a first device and second device in a mixed HFC and RFoG network when the transmission of the first device and the transmission of the second device overlapped in time. If a lost transmission event occurred, a data element can be associated with the lost transmission event grouping the first device and second device into a category. The data element can be used to prevent the first device and the second device from transmitting in overlapping time slots.

3 Claims, 9 Drawing Sheets

SCHEDULING FOR MIXED RFOG AND HFC NETWORKS BASED ON TRANSMISSION HISTORY

TECHNICAL FIELD

This disclosure relates to scheduling transmissions for user devices.

BACKGROUND

The Data-Over-Cable Service Interface Specification (DOCSIS) was established by cable television network operators to facilitate transporting data traffic, primarily Internet traffic, over existing community antenna television (CATV) networks. In addition to transporting data traffic, as well as television content signals over a CATV network, multiple services operators (MSO) also use their CATV network infrastructure for carrying voice, video on demand (VoD) and video conferencing traffic signals, among other types.

In addition to providing services through the MSO over a hybrid fiber-coax (HFC) network, services may also be provided through a radio frequency over glass (RFoG) network, which generally includes a topology that can allow for an MSO to provide for a fiber architecture from the headend to a field node at a user's location (the field node may also be referred to as an optical network unit (ONU)). With an RFoG network, the "Coaxial" portion of the HFC might only exist within the subscriber's residence. When more than one ONU in an RFoG network transmits upstream at any one time, transmission interference issues can arise. Moreover, other complications can occur when RFoG networks are deployed into existing HFC networks. A cable modem termination system (CMTS) can be used to aid in the transmission efficiency of devices on a mixed RFoG and HFC network.

SUMMARY

This disclosure describes systems and methods that can operate to schedule the transmission of data from various user devices in a mixed HFC and RFoG environment. In example implementations, a CMTS or other scheduling system can perform a method of scheduling the transmission of user devices on a mixed RFoG and HFC network.

BRIEF DESCRIPTION OF THE DRAWINGS

Like reference numbers and designations in the various drawings indicate like elements.

DETAILED DESCRIPTION

In some implementations of this disclosure, systems and methods can operate to schedule the transmission of data from various user devices, such as cable modems, in a mixed HFC and RFoG environment. If one or more devices have a history of lost transmissions when they transmit information simultaneously, a CMTS can be operable to prevent one or more devices on an RFoG network from transmitting during overlapping time slots (even if on a different frequency) by assigning non-overlapping time slots on a bandwidth allocation map (or transmission map).

Figure 1:
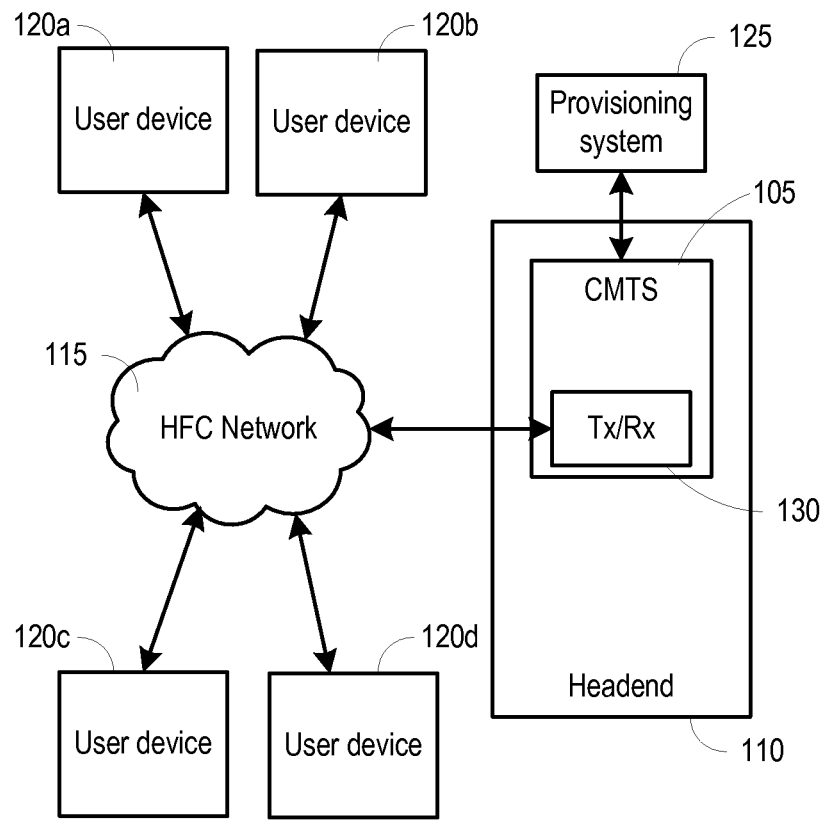
FIG. 1 is a block diagram illustrating an example network environment showing an HFC network coupled to a headend.

FIG. 1 is a block diagram illustrating an example network environment 100 that can include a cable modem termination system (CMTS) 105 located at a headend 110 of a multiple service operator (MSO), such as a cable company. FIG. 1 can also include a network, such as a Hybrid Fiber-Coaxial ("HFC") network 115, through which one or more user devices 120a-d (e.g., which may include cable modems, EMTAs (also known as cable telephony modems), or set-top boxes) can communicate with the CMTS 105. It should be understood that only four user devices 120a-d are shown (for illustrative purposes), but more may be deployed. FIG. 1 can also include a provisioning system 125 operable of communicating with one or more CMTSs.

In some implementations, a headend 110 can provide video, data and voice service to a subscriber. The CMTS 105 can include a processor, a memory, and a storage device. It may also have one or more transmitters/receivers 130 for transmitting signals through one or more networks, including the HFC network 115, to one or more user devices 120a-d. The transmitters/receivers 130 can be one or more separate transmitter and receiver components residing on the same board, or separate boards; further, the transmitter and receiver can also include various sub-components, such as modulators and demodulators. The CMTS 105 can also receive data signals from user devices, such as cable modems 120a-d, EMTAs, and/or set top boxes, through one or more networks, including the HFC network 115.

The example HFC network 115 can use a combination of optical fibers and coaxial cable to send data to and receive data from the headend 110. The HFC network 115 can be bi-directional, wherein signals are carried in both directions on the same network from the headend 110 to the user devices 120a-d, and from the user devices 120a-d to the headend 110. The downstream signals, which can also be referred to as forward-path signals, carry information from the headend 110 to the home such as video content, voice, and internet data. The upstream signals, which may also be referred to as return-path signals, carry information from user devices to the headend 110, such as control signals to order a movie, or internet data such as email.

The optical fiber portion of an HFC network 115 can extend from the headend 110 (e.g., including centralized, local or regional headends) to one or more neighborhoods' hubsite, and then to a fiber optic node. The co-axial portion of an HFC network 115 uses co-axial cable connecting the fiber optic node to a plurality of homes having end user devices 120a-d. In example implementations, the HFC transmitter/ receiver 130 can transmit communications directly to an HFC network (e.g., HFC network 115 of FIG. 1). In other implementations, the HFC/modulation interface 340 can transmit communications to a modulator (e.g., an EQAM, combiner, mixer, etc.) for generation of an RF signal for transmission on an HFC network. The various signals from the headend 110 may be encoded, modulated, and/or upconverted onto RF carriers, combined onto an electrical signal, and inserted into a broadband optical transmitter. The broadband optical transmitter can be operable to convert the electrical signal to a downstream optically modulated signal that is sent to one or more fiber optic nodes. An example fiber optic node has a broadband optical receiver which converts the downstream optically modulated signal into an electrical signal operable to propagate through co-axial cables to end user devices 120a-d. The downstream electrical signal can be a radio frequency (RF) modulated signal. The forward-path and the return-path may be carried over the same coaxial cable in both directions between the optical node and the end user devices. To prevent interference of signals, the frequency band may be divided into two sections in which one frequency band carries forward-path signals, and another carries return-path signals. For the return path, one of the user devices 120a-d transmits on any given frequency at any given time. However, it should be noted that multiple user devices 120a-d can transmit at different frequencies simultaneously. Typically, requests for upstream bandwidth are made by the user devices 120a-d. The CMTS 105 may grant or deny such requests. In some implementations, the CMTS 105 can generate one or more transmission maps that allocate user devices 120a-d a specific time slot and frequency at which the user devices 120a-d may transmit. The transmission maps can be generated using, for example, DOCSIS 3.0's enhanced concatenation and fragmentation algorithm, or any other suitable algorithm.

FIG. 1 also shows a provisioning system 125. The provisioning system can be operable to communicate with one or more CMTSs. Among other functions, a provisioning system 125 can include software that can be used to get user devices 120a-d ready to exchange data, including activating the CMTS to dynamically assign IP addresses to user devices 120a-d.

Figure 2:
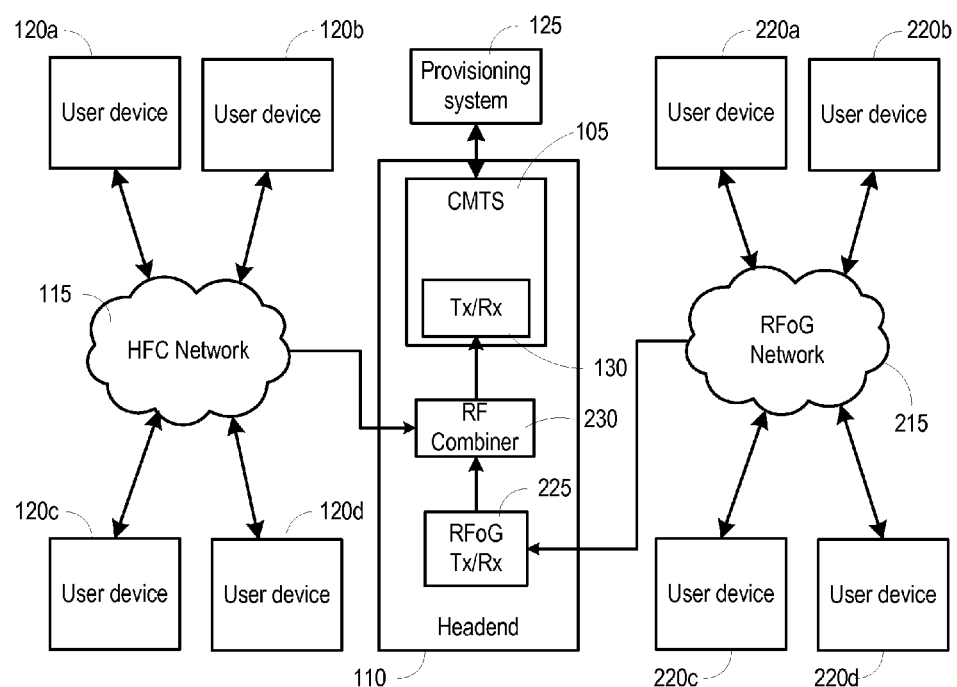
FIG. 2 is a block diagram illustrating an example network environment showing a both an RFoG network and a HFC network, both coupled to a headend.

FIG. 2 is an illustration of an example radio frequency over glass (RFoG) network 215 that is deployed with an existing HFC network 115. An RFoG topology includes an all-fiber service from the headend 110 to a field node, or optical network unit (ONU) (see FIG. 3), which is typically located at or near the user's premises. Coaxial cable can be used to connect the ONUs of an RFoG network to one or more user device 220a-d, wherein the RFoG user devices 220a-d can include cable modems, EMTAs, or set-top boxes, as with the user devices of an HFC network. In the headend, a downstream laser sends a broadcast signal that is optically split multiple times. The optical network unit, or ONU, recovers the RF broadcast signal and passes it into the subscriber's coax network.

Upstream transmissions from the user devices 220a-d can pass through the RFoG network 215 and be received by an RFoG transmitter/receiver 225 at the headend. In various implementations, the RFoG transmitter/receiver 225 may be one or more separate transmitter and receiver components residing on the same board, or alternatively separate boards; further, the transmitter and receiver may also include various sub-components, such as modulators and demodulators. The RFoG transmitter/receiver 225 receives the optically modulated signals on optical channels and demodulates the signals into the electrical signals, which may be RF signals. Signals from the RFoG network 215 may then be combined with one or more RF signals coming from other HFC networks such as HFC network 115, or from other RFoG networks using an RF Combiner 230, before being received by the CMTS transmitter/receiver 130. The connections illustrated between the RFoG network 215 and the HFC network 115 and the CMTS transmitter/receiver reflect an upstream transmission only.

Figure 3:
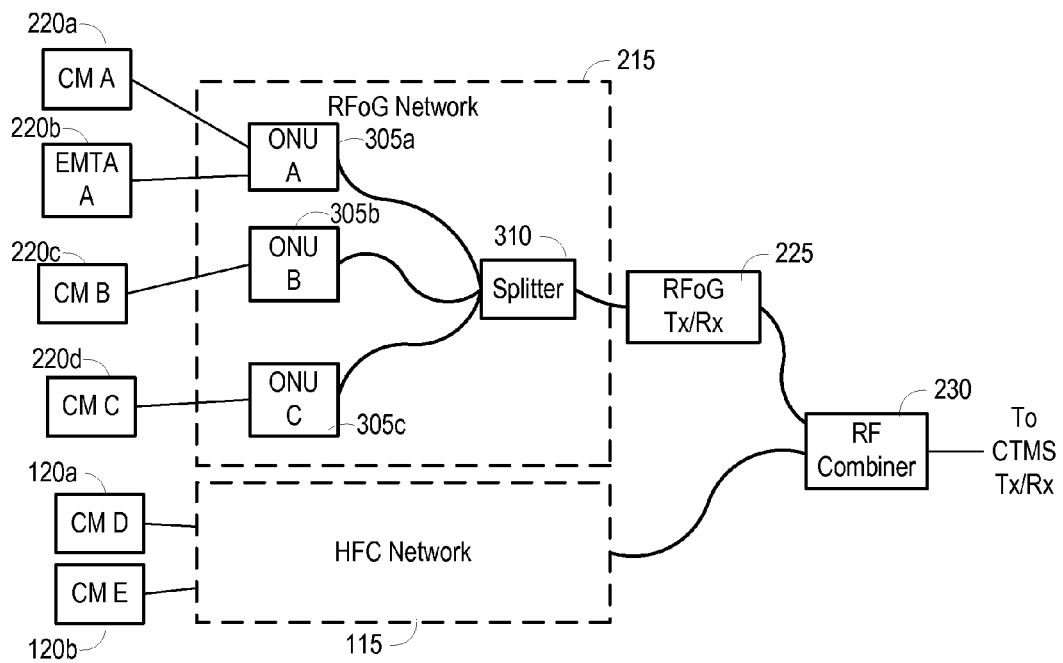
FIG. 3 is a block diagram illustrating example components of an RFoG network.

FIG. 3 illustrates components that may be part of the example RFoG network 215. User devices 220a-d may be connected to an RFoG network 215, wherein the RFoG network 215 may include one or more ONUs 305a-c connected to an optical splitter 310. In the example shown, user device 220a may be a cable modem A (CM A), user device 220b may be an EMTA (EMTA A), wherein both CM A 220a and EMTA A 220b are connected to the same ONU (e.g., ONU A 305a). In this example, user device 220c can be a cable modem (CM B) and connected to ONU B 305b, and user device 220d may be a cable modem (CM C) connected to ONU C 305c.

The user devices 220a-d can transmit RF signals to their respective ONUs 305a-c. The ONU 305a-c can modulate the upstream RF traffic onto optical channels and sends those signals to the optical splitter, which then passes on the signals on the optical channels to the RFoG transmitter/receiver 225, which may be located at the headend 110. As mentioned above, the RFoG transmitter/receiver 225 recovers the RF signals from the optical channels via demodulation. The RF signals can then be sent to an RF combiner 230, where the RF signals may be combined with other RF signals from other RFoG or HFC networks. One consideration in the upstream, however, is that more than one ONU transmitting at a time can cause interferometric beat noise, a condition which can be referred to as optical beat interference (OBI). This condition can result in both transmissions being lost. Systematic studies of OBI have not been generally released, but the severity of OBI has been found to correlate to the frequency spread of the transmitting lasers, and also may result from architectural factors and device factors.

Figure 4:
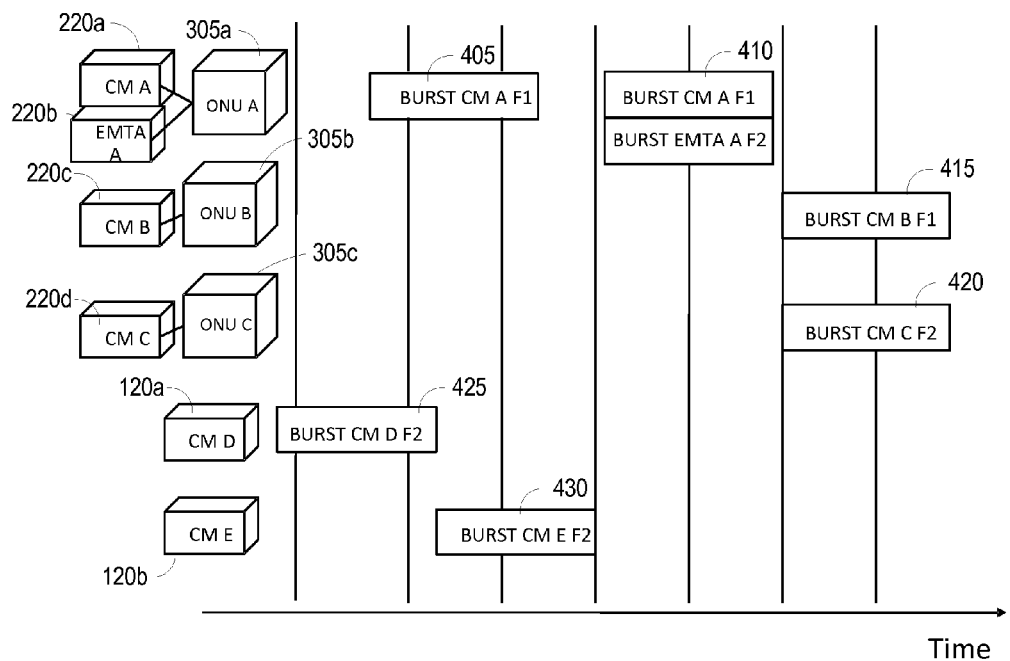
FIG. 4 is a diagram illustrating examples of transmissions of user devices.

FIG. 4 illustrates example transmission scenarios that may or may not result in OBI, wherein transmissions may be made of a particular frequency for duration of time. Assuming that the topology of the user devices 220a-d, 120a-b, and networks (both RFoG and HFC) are as illustrated in FIG. 3, the ONU should not transmit signals at the same time as any of the other ONUs in the same RFoG network 215, or service group in order to avoid possible OBI. Thus, if ONU 305a, ONU 305b, and ONU 305c were in the same RFoG service group, transmission 405 and transmission 410 from ONU A typically do not create a situation that results in OBI, wherein transmission 410 contains the RF bursts of frequencies F1 and F2 at the same time from CM A 220a and EMTA A 220b, respectively, modulated on the same optical channel. But, transmission 415 from ONU B 305b and transmission 420 from ONU C 305c, may lead to OBI because they occur at the same time and because ONU B 305b and ONU C 305c are part of the same RFoG service group. If ONU B 305b and ONU C 305c were part of separate RFoG service groups, then the RF signals of two different frequencies that are recovered after going through separate RFoG transmitter/receivers could be combined by an RF combiner (described in more detail below in FIG. 6).

Of further consideration is that the RFoG network 215 and HFC network 115 as illustrated in FIG. 3 and having the transmissions in FIG. 4 co-exist together and terminate at the same CMTS transmitter/receiver 130. As in an example HFC network, transmissions from user devices, for example user device 120a and 120b, can be transmitted at the same time at different frequencies (DOCSIS3.0 introduced upstream channel bonding which enables the cable modem to be assigned different frequencies for the same time), or may be at the same frequency at different times, as illustrated in FIG. 4. In FIG. 4, the transmission burst 425 from CM D 120a and the transmission burst 430 from CM E 120b are RF signals at the same frequency, but at different times. When mixed with an RFoG network 215, the resulting RF signals coming from the HFC network 115 and the signals coming from the RFoG network 215 via RFoG transmitter/receiver 225 should be of separate frequencies if transmitted at the same time, or can be of the same frequency if transmitted at different times. These frequencies can be combined by the RF combiner 230. As shown in FIG. 4, the resulting RF signals recovered from transmission bursts 405 and 410 from the RFoG network 215 can be combined with the RF signals recovered from bursts 425 and 430 from the HFC network. These signals after passing through the RF combiner 230 would either be of different frequencies at the same time (such as the RF signals recovered from transmission bursts 405, 425, and 430), or the same frequency at separate times.

Figure 5:
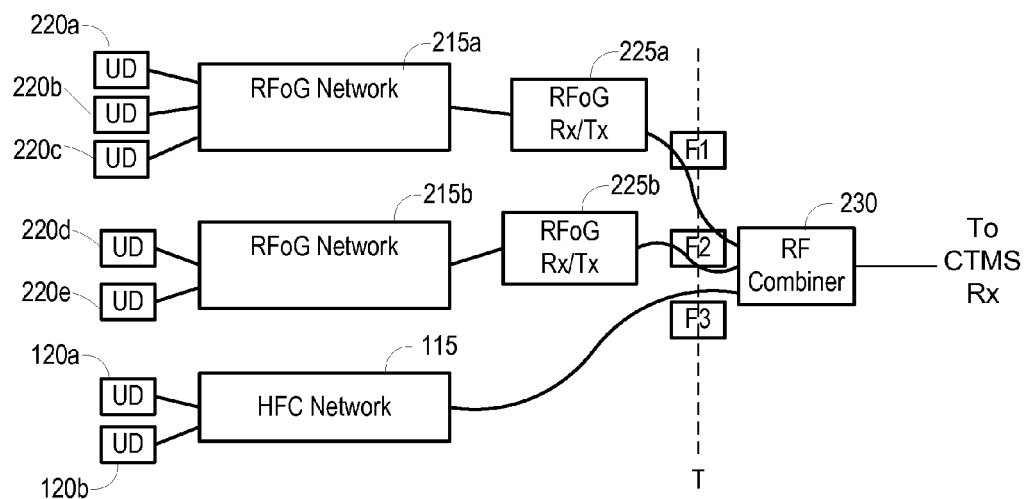
FIG. 5 is a block diagram illustrating a network topology having more than one RFoG network.

FIG. 5 shows an example mixed RFoG and HFC network that includes two RFoG networks 225a and 225b, and one HFC network 115. The RFoG networks 215a-b can be coupled with one or more user devices 220a-e. Each one of the user devices 220a-e can be connected to an ONU in the RFoG networks 215a and 215b. An ONU can be connected to more than one user device 220a-e. If any ONU within each RFoG network 215a or 215b transmits at the same time, the resultant signal received by the RFoG transmitter/receivers 225a-b might suffer from OBI. However, in FIG. 5, the resulting RF signals F1, F2, and F3 coming out of the RFoG networks 225a-b and the HFC network 115 at the same time, T, may be combined into one signal by an RF combiner 230. If any of the three signals were at the same frequency, interference may occur. Thus, note that an ONU on RFoG network 215a, and an ONU on RFOG network 215b, may transmit at the same time and avoid OBI.

A CMTS transmission map allocation that does not take into account OBI can allow for ONUs to transmit at the risk of inefficiency—lost transmissions due to OBI would have to be transmitted again. In a mixed RFoG and HFC network, in which the CMTS 105 is not aware of the topology on which each user device sits, the CMTS may transmit a transmission map that assigns slots to allow for no simultaneous upstream transmissions on the same frequency. However, this would result in a throughput that would almost be halved.

Other implementations can include employing a separate receiver for RFoG and HFC networks, wherein traditional transmission map scheduling may be employed for the HFC network, and wherein an algorithm for broadcast mapping that allows for no simultaneous upstream transmissions on the same frequency may be employed for the RFoG network. However, in addition to the added cost of having an extra receiver, if more than one frequency is used for the RFoG network, the throughput of the RFoG network may be almost halved.

In example implementations, a CMTS 105 can be programmed to prevent transmissions in overlapping transmission map time slots by user devices based on the transmission history of the user devices. The CMTS 105 might have no initial knowledge of whether one user device is on the same RFoG network as another, or whether a user device is connected to the same ONU on an RFoG network. When the user devices make a request for upstream transmission, the CMTS 105 assigns slots on a transmission map for the user devices to transmit. For example, if a user device 220a and a user device 220b, which may both be on the same RFoG network, both request upstream transmission time slots, the CMTS might assign overlapping time slots on separate frequencies of the transmission map.

If one of the time slot intervals passes and the CMTS 105 does not successfully receive data from both user devices 220a or 220b, then the unsuccessful transmission by user device 220a and 220b may have been due to OBI. The CMTS 105 can be programmed to work under the assumption that OBI interference prevented the reception of data from user device 220a and user device 220b. If data was not received, the CMTS 105 can record a data element in memory that can be used to identify the user devices 220a and 220b as being in the same grouping or related to each other (for example, in the same RFoG group, or in a group of devices that should not be allowed to transmit in overlapping transmission map time slots, etc.). The data element can be used to prevent assignment of user devices in overlapping transmission map time slots. When user devices 220a or 220b both request to transmit again, the CMTS can avoid lost transmission due to possible OBI interference by not assigning the devices 220a or 220b overlapping time slots on separate frequencies of the transmission map, and instead assigning non-overlapping slots to prevent loss of transmission. Thus, in this example implementation, the CMTS 105 allows transmission of two devices in overlapping time slots until there is a problem, which may be due to OBI. However, because there is the possibility that the simultaneous transmissions from user device 220a and 220b were lost due to a one-time or infrequent non-OBIT error, the CMTS 105 can also be programmed to not prevent simultaneous transmissions from user devices until a certain threshold number of unsuccessful transmission events have occurred.

Figure 6:
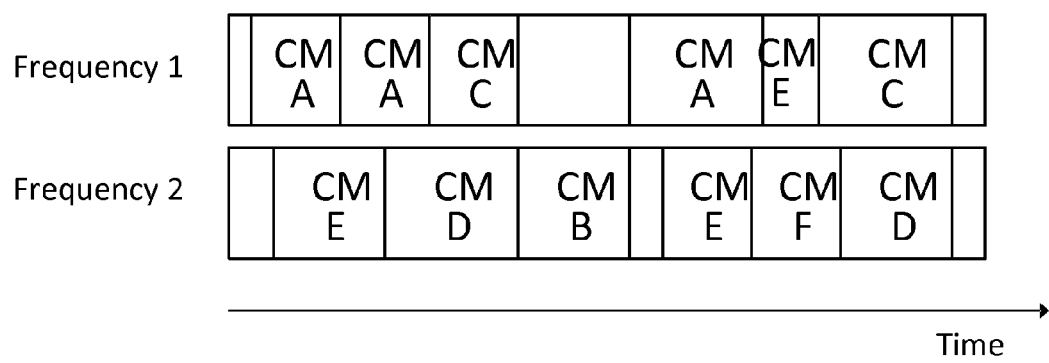
FIG. 6 is a diagram illustrating an example transmission map wherein user devices exist on a mixed RFoG and HFC network.

Using transmission history, the CMTS 105 of a mixed RFoG and HFC network can generate a transmission map to avoid potential OBI and accommodate HFC transmissions, as described in FIGS. 4 and 5 above. FIG. 6 illustrates such an example transmission map 605 having one or more frequencies, and one or more time slots (also referred to as burst frames) for each frequency, wherein the user devices 220a-c are cable modems A, B, and C coupled to an RFoG network 215, and user devices 120a-c are cable modems D, E, and F coupled to an HFC network 115. While six devices and two frequencies are shown for illustrative purposes, more frequencies, more user devices, and more than one RFoG network or HFC network may be employed. The transmission map 605 can be allocated such that the user devices 120a-c on the HFC network 115 can transmit over different frequencies at the same time, consistent with DOCSIS 3.0 upstream channel bonding. Based on the transmission history, the CMTS 105 can prevent simultaneous transmissions made by any of the user devices 220a-c on the RFoG network 215 if simultaneous transmissions by those devices 220a-c might be causing OBI.

In cases in which one or more user devices are part of one or more RFoG networks, but the devices' simultaneous transmissions during overlapping time slots do not cause OBI, then the successful transmission of data from those devices would not cause the CMTS to prevent them from transmitting in overlapping time slots. Such cases include the implementation whereby user devices transmit to the same ONU of an RFoG network 215, for example user device 220a and 220b transmitting to ONU 305a as shown in FIG. 4, whereby the ONU will receive the RF transmissions and modulate those RF signals onto an optical channel and send out one transmission burst, avoiding OBI. Such cases of simultaneous transmissions that do not result in OBI also include implementations in which user devices are on separate RFoG networks. For example, user devices 220*a-c* on RFoG network 215*a* and 220*d-e* on RFoG network 215*b*, as shown in FIG. 5, whereby the resulting RF signals at F1 and F2 (e.g., different frequencies) coming out of the RFoG transmitter/receivers 225*a-b* at the same time T may be free from OBI and combined into one signal by an RF combiner 230.

Figure 7:
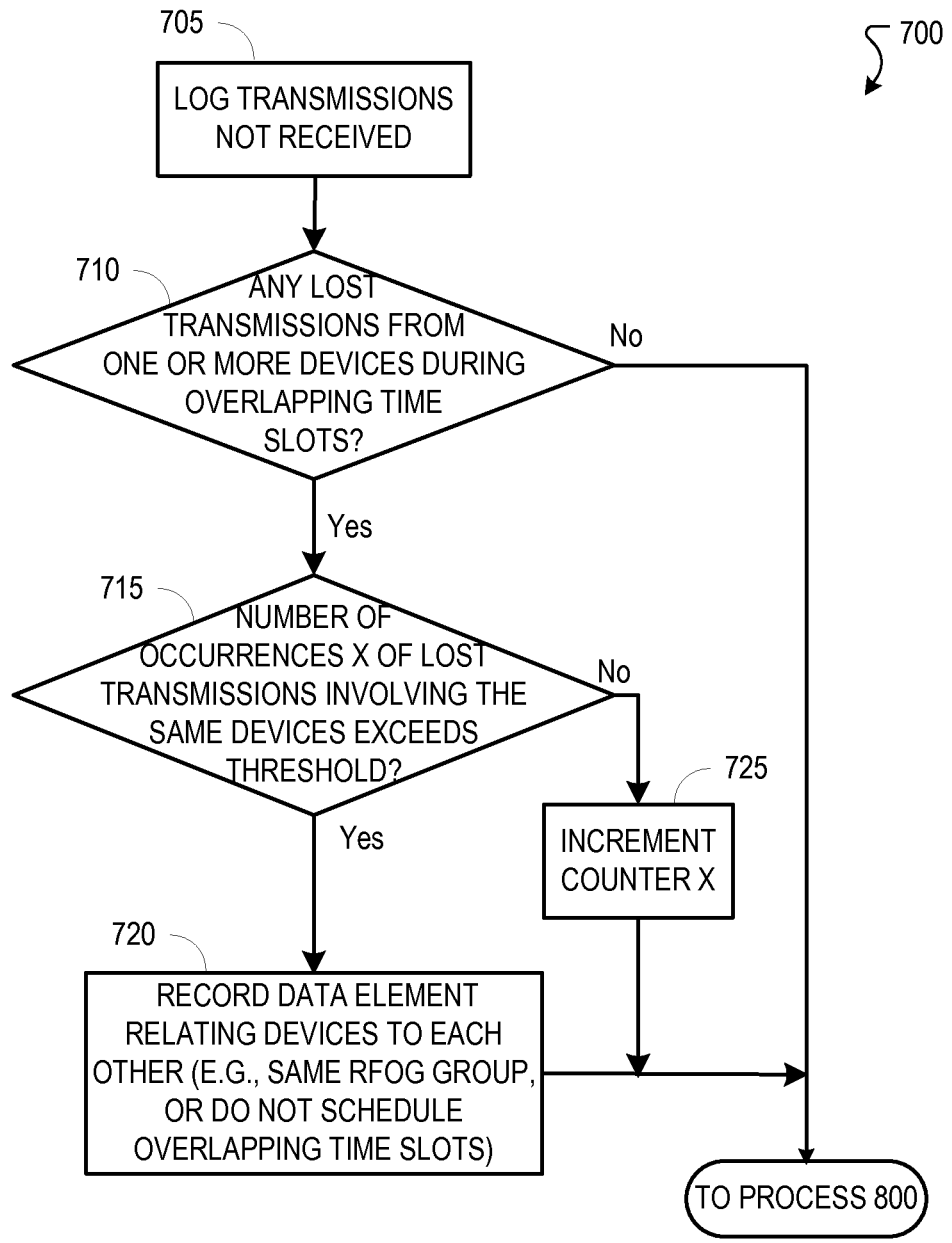
FIG. 7 is a flow diagram illustrating an example transmission map allocation process that may be performed by a CMTS that services a mixed RFoG and HFC network.

FIG. 7 is a flowchart illustrating an example process performed in a mixed HFC and RFoG network, for example as shown in FIG. 2. The process records topology information, or other data elements, for devices that are in the same RFoG group. A CMTS, such as CMTS 105, may be operable to perform this process. The CMTS 105 might have no initial knowledge as to whether any simultaneous transmissions by any devices transmitting to the CMTS 105 will experience OBI due to RFoG topology. When user devices, for example user devices 120*a-d* and 220*a-d*, make a request for upstream transmission, the CMTS 105 assigns slots on a transmission map for the user devices 120*a-d* and 220*a-d* to transmit. The CMTS 105 might assign to user devices 120*a-d* and 220*a-d* overlapping time slots on separate frequencies of the transmission map.

At stage 705, the CMTS 105 logs transmissions that were not received from any user devices 120*a-d* and 220*a-d* when their time slot intervals have passed and no transmissions were received. At stage 710 of the process, the CMTS 105 reviews the log to determine if any of the lost transmissions were sent by any user devices 120*a-d* and 220*a-d* at the same time (overlapping time slots). Because the possibility exists that a one-time or infrequent non-OBI error may have prevented a successful transmission of data by the user devices 120*a-d* and 220*a-d*, the CMTS 105 can be programmed to increase a counter X each time a lost transmission event has occurred involving overlapping transmissions by the one or more user devices 120*a-d* and 220*a-d*.

If X has reached or exceeded the threshold value, which can be any arbitrary number that is believed to eliminate the likelihood that the lost transmissions were due to non-OBI errors, then the CMTS 105 at stage 720 may treat the one or more devices as if they are on the same RFoG network and that OBI might be the cause of lost transmissions when the devices were transmitting during overlapping time slots. The CMTS 105 can record a data element in memory that can be used to identify the user devices 220*a* and 220*b* as being in the same grouping or related to each other (for example, in the same RFoG group, or in a group of devices that should not be allowed to transmit in overlapping transmission map time slots, etc.). At stage 715, if the threshold value has not been met, then the counter X is incremented at stage 725. The process can then move to process 800, described in FIG. 8.

Figure 8:
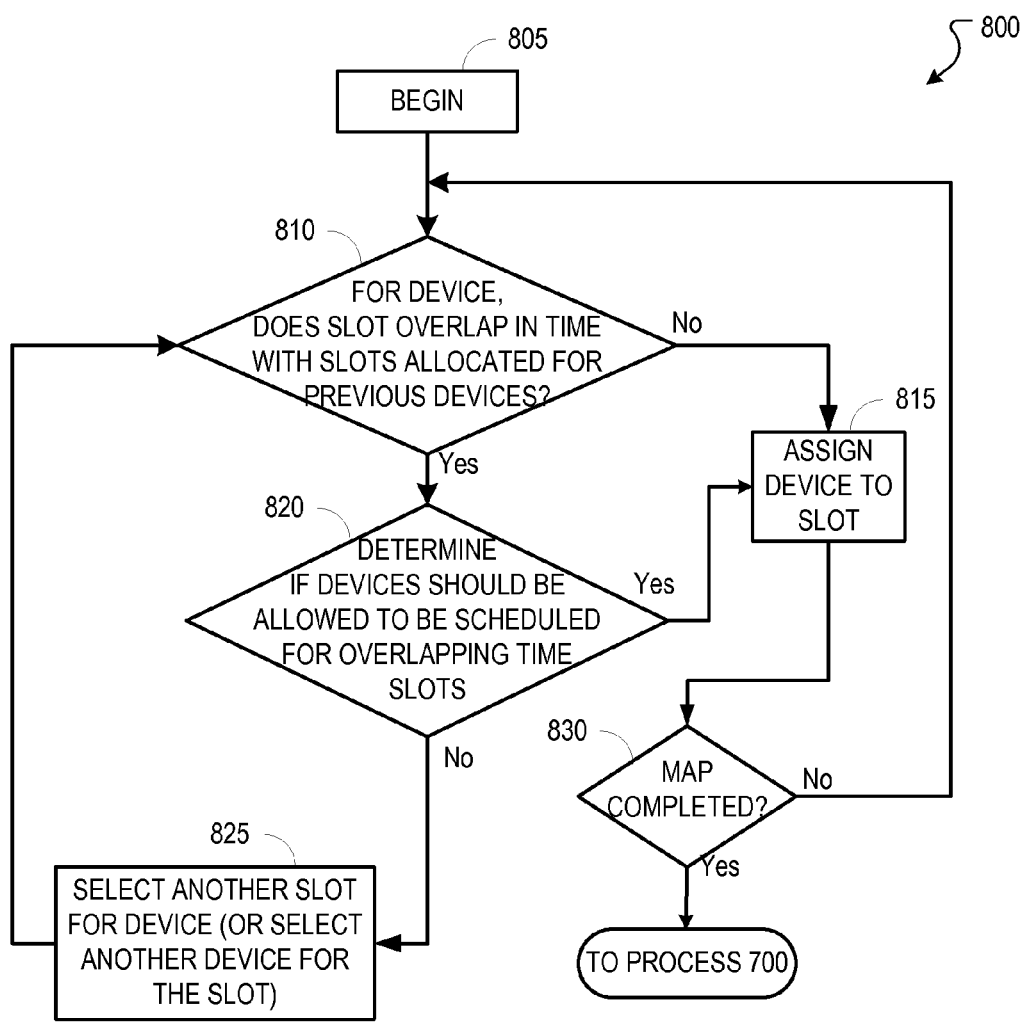
FIG. 8 is a flowchart illustrating an example process for generating a transmission map for a mixed RFoG and HFC network.

FIG. 8 is a flowchart illustrating an example process 800 for generating a transmission map for a mixed RFoG and HFC network. The process 800 can begin at stage 805, whereby a previous transmission map might have already been transmitted to user devices, and process 700, as described in FIG. 7, might have already been executed. Additionally, requests for transmission might have been sent by user devices, and the CMTS 105 might have already assigned a time slot to one device (for example, 120*a*).

At stage 810, the CMTS operates to assign a time slot to the next device (for example, 220*a*). Whether the CMTS 105 operates to assign every time slot for one frequency before moving on to the next frequency, or the CMTS 105 operates to assign a first time slot for a first frequency, and then a subsequent time slot for a different frequency, the CMTS 105 might eventually encounter a situation in which it assigns a time slot for a device that may overlap in time with a time slot that was allocated for one or more previous user devices.

If the CMTS 105 determines that the time slot does not overlap with a time slot allocated for an existing device, it can assign the device the slot, as shown in FIG. 8 stage 815. After the allocation is made, the CMTS 105 can allocate more time slots for other devices, if the transmission map has not been completed. In assigning the device a time slot at state 815, the CMTS 105 can also factor in any algorithms for assigning user devices time slots, for example using DOCSIS 3.0's enhanced concatenation and fragmentation algorithm, or any other suitable algorithm.

At stage 810, if the CMTS 105 determines that the time slot it wanted to allocate to the present user device overlaps with a time slot allocated for any other device at another frequency, then the CMTS 105 can determine if the user devices should be allowed to transmit during overlapping time slots. As mentioned above, DOCSIS 3.0 upstream channel bonding allows for two devices to transmit RF signals of different frequencies at the same time. While there might be no OBI issues with an HFC network, when one or more user devices are on the same RFoG network, particularly if not transmitting via the same ONU or from different RFoG groups, overlapping time transmissions might result in OBI.

At stage 820, the CMTS 105 can use the data elements stored for the user devices in its memory from stage 720 of FIG. 7 to prevent assignment of user devices in overlapping transmission map time slots. If the user devices are part of the same RFoG group, or the same "do not allow overlapping transmissions" group, for example, the CMTS at stage 825 can attempt to schedule another time slot for the device that does not conflict with previous device assignments. The process can proceed to stage 810, and if the device's time slot still overlaps with another device's time slot, the determination can be repeated at stage 820.

As indicated in stage 830, process 800 can be repeated until all of the devices are assigned slots on the transmission map. Once finished, a map can be sent to the user devices requesting transmission, the devices can transmit, and the CMTS 105 can then repeat process 700.

Figure 9:
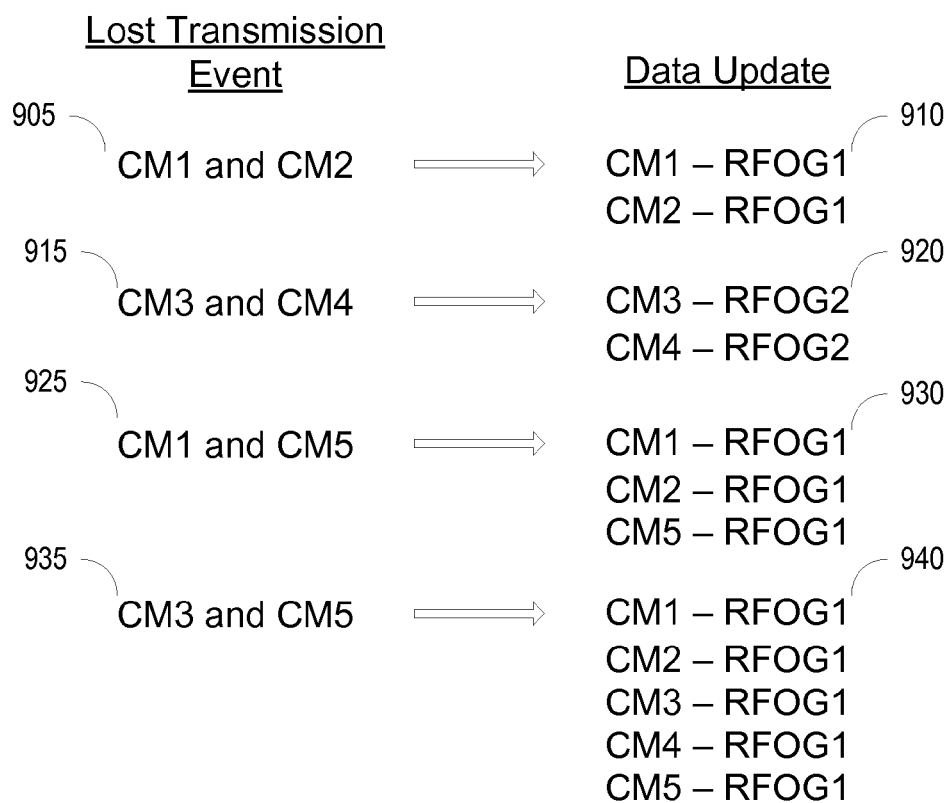
FIG. 9 is a flow diagram illustrating an example data update process.

FIG. 9 is an illustration of an example data update process the CMTS 105 can perform. The CMTS 105 can be programmed to wait for an actual lost transmission event between two devices before taking action with respect to the two devices. In other example implementations, the CMTS 105 can be programmed to make logical deductions.

As shown in FIG. 9, if a lost transmission event 905 (or repetitive lost transmission events) occurs between, for example cable modem 1 (CM1) and cable modem 2 (CM2), then the CMTS 105 can perform a data update 910 by recording data elements in its memory that indicate that CM1 and CM2 are in the same grouping, for example, the same RFoG group, or the same "do not transmit in overlapping time slots" group.

As illustrated in FIG. 9, CM1 and CM2 have both been designated as being in the RFOG1 group. The CMTS 105, if it receives any subsequent requests from CM1 and CM2, based on this grouping, will not schedule CM1 and CM2 for transmission in overlapping time slots. Likewise, lost transmission event(s) 915 between CM3 and CM4 can similarly result in CM3 and CM4 being associated with the RFOG2 group in update 920.

If CM1 and CM5 subsequently experience a lost transmission event 925, the CMTS 105 can associate CM1, CM2, and CM5 together in data update 930. If a lost transmission event 935 is experienced between CM3 and CM5, the CMTS 105 can be programmed to perform a data update 940 that associates CM1, CM2, CM3, CM4, and CM5 in the same group (RFOG1, for example). Thus, even though no lost transmissions have occurred between CM3 and CM2, for example, CM2 and CM3 can be associated with the same data element indicating that they should not be allowed to transmit during the same time slot by virtue of their association with lost transmission events with other devices in common.

Any of the devices (e.g., CMTS, cable modems, EMTAs, etc.) described in this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube), LCD (liquid crystal display), LED (light emitting diode) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A method for scheduling the transmission of user devices on a mixed radio frequency over glass (RFoG) and hybrid fiber-coax (HFC) network comprising:
   determining whether a lost transmission event occurred between a first user device and second user device in the mixed HFC and RFoG network, wherein the transmission of the first user device and the transmission of the second user device overlapped in time;
   if a lost transmission event occurred, grouping the first user device and second user device into a category, determining whether a threshold of lost transmission events have occurred between the first user device and the second user device and then associating a data element grouping the first user device and second user device into the category;
   generating a transmission map for devices on the mixed RFoG and HFC network, the transmission map being based on previous grouping of the devices by:
      selecting a time slot for each of a plurality of devices on the mixed RFoG and HFC network, determining whether the time slot selected for each of the plurality of devices overlap in time, and assigning the time slots to each of the plurality of devices if the time slots do not overlap in time;
      wherein selecting, determining and assigning comprises an iterative process whereby a particular time slot is selected for a current device and the selected particular time slot is compared to previously assigned time slots, and if the particular time slot does not overlap in time with a previously assigned time slot, the particular time slot is assigned to the current device, if the particular time slot overlaps in time with the previously assigned time slot, determining if the current device and a second device assigned the previously assigned time slot can be scheduled into overlapping time slots, if the current device and the second device can be scheduled into overlapping time slots, assigning the particular time slot to the current device, and if the current device and the second device cannot be scheduled into overlapping time slots, selecting a new time slot and repeating the iterative process;
   assigning the first user device a slot on the transmission map;
   determining whether the assignment of the second user device to a slot on the transmission map will overlap in time with the first user device;
   if the assignment of the second user device to a slot on the transmission map will overlap in time with the first user device, then determining whether the data element is associated with the first user device and the second user device; and
   if the first user device and the second user device were grouped together by the data element, then assigning the second user device to another time slot.

2. A method for scheduling the transmission of user devices on a mixed radio frequency over glass (RFoG) and hybrid fiber-coax (HFC) network comprising:
   determining whether a lost transmission event occurred between a first user device and second user device in the mixed HFC and RFoG network, wherein the transmission of the first user device and the transmission of the second user device overlapped in time;
   if a lost transmission event occurred, associating a data element grouping the first user device and second user device into a category;
   using the data element to prevent the first user device and the second user device from transmitting in overlapping time slots; and
   generating a transmission map for devices on the mixed RFoG and HFC network, the transmission map being based on previous grouping of the devices by:
      selecting a time slot for each of a plurality of devices on the mixed RFoG and HFC network, determining whether the time slot selected for each of the plurality of devices overlap in time, and assigning the time slots to each of the plurality of devices if the time slots do not overlap in time;
      wherein selecting, determining and assigning comprises an iterative process whereby a particular time slot is selected for a current device and the selected particular time slot is compared to previously assigned time slots, and if the particular time slot does not overlap in time with a previously assigned time slot, the particular time slot is assigned to the current device, if the particular time slot overlaps in time with the previously assigned time slot, determining if the current device and a second device assigned the previously assigned time slot can be scheduled into overlapping time slots, if the current device and the second device can be scheduled into overlapping time slots, assigning the particular time slot to the current device, and if the current device and the second device cannot be scheduled into overlapping time slots, selecting a new time slot and repeating the iterative process.

3. A method for scheduling the transmission of user devices on a mixed radio frequency over glass (RFoG) and hybrid fiber-coax (HFC) network comprising:
   determining whether a lost transmission event occurred between a first user device and second user device in the mixed HFC and RFoG network, wherein the transmission of the first user device and the transmission of the second user device overlapped in time;
   if a lost transmission event occurred, determining whether a threshold of lost transmission events have occurred between the first user device and the second user device;
   if the threshold of lost transmission events have occurred, then associating a data element grouping the first user device and second user device into a category;
   using the data element to prevent the first user device and the second user device from transmitting in overlapping time slots; and
   generating a transmission map for devices on the mixed RFoG and HFC network, the transmission map being based on previous grouping of the devices by:
      selecting a time slot for each of a plurality of devices on the mixed RFoG and HFC network, determining whether the time slot selected for each of the plurality of devices overlap in time, and assigning the time slots to each of the plurality of devices if the time slots do not overlap in time;
      wherein selecting, determining and assigning comprises an iterative process whereby a particular time slot is selected for a current device and the selected particular time slot is compared to previously assigned time slots, and if the particular time slot does not overlap in time with a previously assigned time slot, the particular time slot is assigned to the current device, if the particular time slot overlaps in time with the previously assigned time slot, determining if the current device and a second device assigned the previously assigned time slot can be scheduled into overlapping time slots, if the current device and the second device can be scheduled into overlapping time slots, assigning the particular time slot to the current device, and if the current device and the second device cannot be scheduled into overlapping time slots, selecting a new time slot and repeating the iterative process.

* * * * *